United States Patent [19]
Pittman

[11] 3,965,990
[45] June 29, 1976

[54] HAND HELD GARDEN IMPLEMENT

[76] Inventor: Gloucester R. Pittman, 623 N. Stone Mountain-Lithonia Road Rte. 3, Stone Mountain, Ga. 30083

[22] Filed: Apr. 21, 1975

[21] Appl. No.: 570,242

[52] U.S. Cl. .............................. 172/375; 172/380; 172/381
[51] Int. Cl.² ..................... A01B 1/20; A01B 1/10
[58] Field of Search .......... 172/371, 372, 373, 374, 172/375, 377, 378, 380, 381, 724, 730; 7/1 L, 14.1 R, 14.55, 17; 294/49, 51, 55, 56; D8/1, 6, 7, 10, 11; 403/263

[56] References Cited
UNITED STATES PATENTS

| | | | |
|---|---|---|---|
| 29,389 | 9/1898 | Vinson | D8/11 |
| 488,582 | 12/1892 | Smith | 172/381 |
| 589,863 | 9/1897 | Scott | 172/381 |
| 878,920 | 2/1908 | Williams | 172/375 |
| 1,006,819 | 10/1911 | Adams | 172/375 |
| 1,101,149 | 6/1914 | Schoener | 172/381 |
| 1,776,187 | 9/1930 | Krise | 172/375 |
| 1,946,006 | 2/1934 | Struckmeyer | 172/375 |
| 2,141,533 | 12/1938 | Hubbell | 172/375 |
| 2,548,012 | 4/1951 | Frost | 172/374 |
| 2,737,101 | 3/1956 | Hutchins | 172/375 X |

FOREIGN PATENTS OR APPLICATIONS 3,743 2/1898 United Kingdom ................ 172/381

Primary Examiner—Richard T. Stouffer

[57] ABSTRACT

A hand held garden implement having a working body portion with a tapered digging blade depending from the body and a pair of elongated rake blades projecting from the body portion so that the implement can be used for digging and other like uses by the tapered blade and for raking and de-weeding by the rake blades. Another embodiment is disclosed wherein the body portion has a third rake blade disposed between the other two to facilitate the raking function of the implement.

3 Claims, 7 Drawing Figures

U.S. Patent June 29, 1976 3,965,990
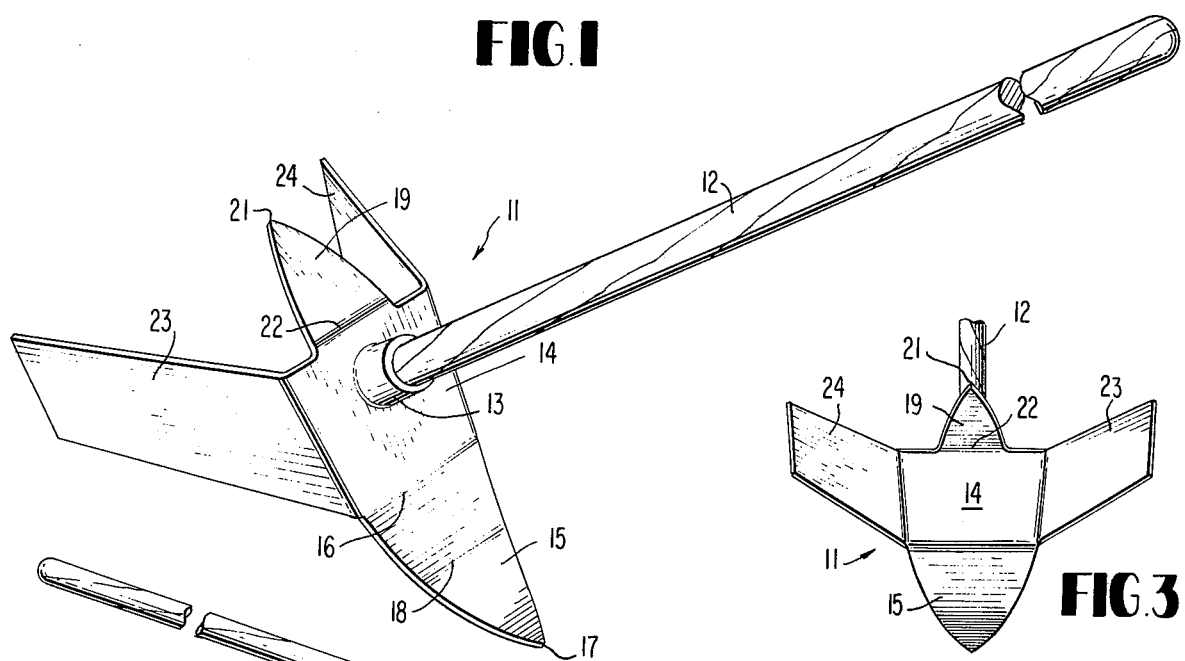
FIG.1
FIG.3
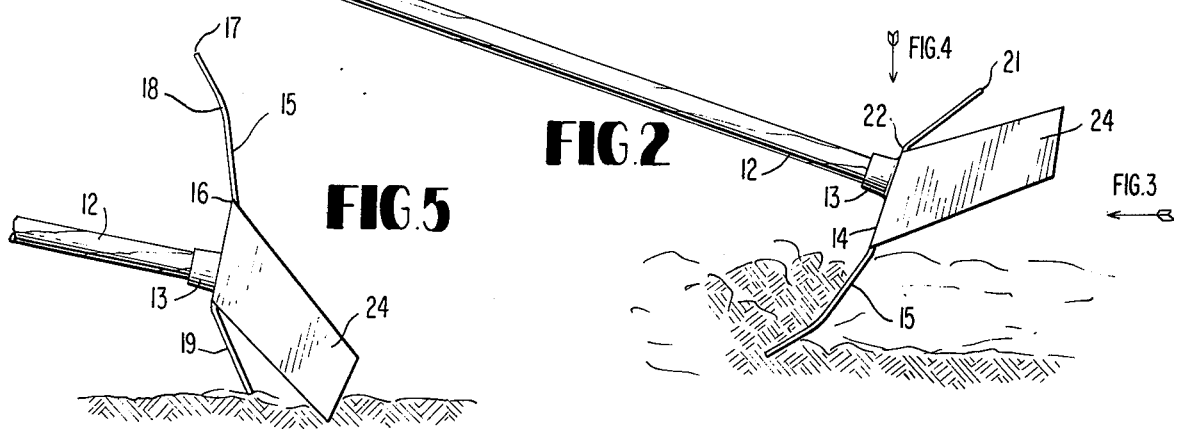
FIG.2
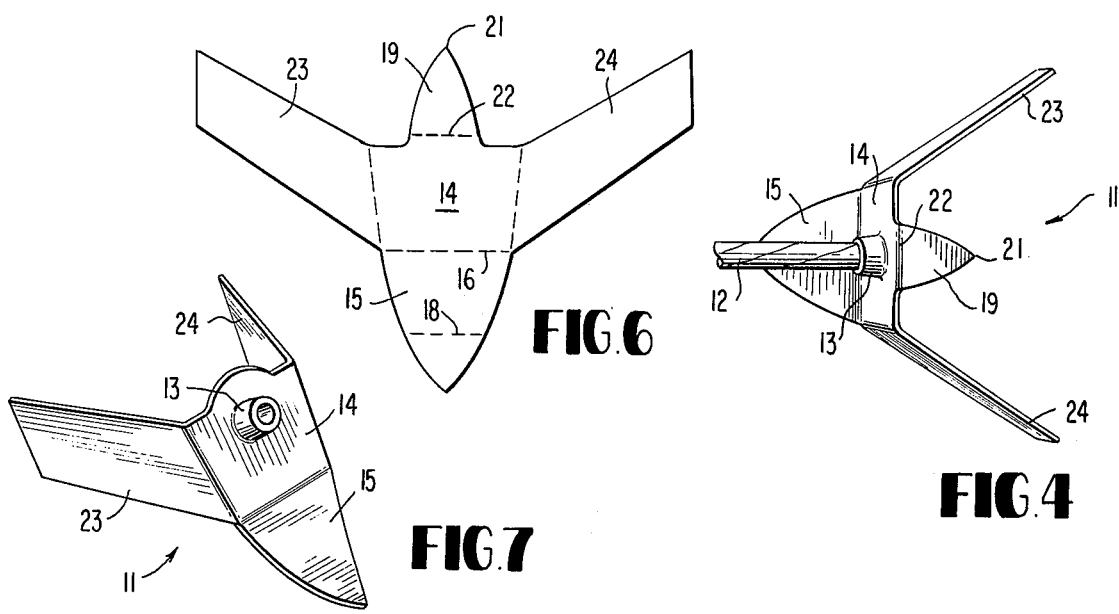
FIG.5
FIG.6
FIG.7
FIG.4

HAND HELD GARDEN IMPLEMENT

The present invention generally pertains to garden implements and more particularly to hand held garden implements designed to do a plurality of garden chores.

Hand held garden implements are well known in the art and this is particularly true of hoes, rakes, small hand held plows and other digging implements. In the past, a gardner, in order to properly work his garden would need a multiplicity of garden implements to do such jobs as raking, scraping dirt from around plants, de-weeding, plowing the garden to lay off rows and plowing around plants after they have begun to grow, and to chop or hoe in the normal manner. This proves expensive in the way of tools and while each of the previous implements were designed for a particular purpose, it has been found that one implement can be designed to do all jobs very satisfactorily.

Therefore, an object of the present invention is the provision of a hand held garden implement of extreme versatility.

Another object of the invention is the provision of a garden implement which will combine the functions of several previously known implements into one hand held unit.

Yet another object of the invention is the provision of a hand held garden implement of original design, superior to previously known implements and one that is of simple construction and yet is of low cost.

Other objects, advantages and capabilities of the invention will become apparent from the following description taken in conjunction with the accompanying drawing showing two preferred embodiments of the invention.

IN THE DRAWING:

FIG. 1 illustrates the invention of one embodiment in overall prospective view;

FIG. 2 shows a side elevation view thereof;

FIG. 3 shows a rear elevation view of the invention;

FIG. 4 is a top plan view;

FIG. 5 illustrates an elevation view of the invention being utilized as a rake;

FIG. 6 shows a front elevation view of the invention without the handle attached; and FIG. 7 shows an overall prospective view of the second embodiment of the invention.

Referring to the drawings wherein like reference characters designate corresponding parts throughout the several figures, the garden implement as contemplated in the present invention is generally shown by the numeral 11. The implement 11 comprises a handle 12 by which a user may properly operate the invention in its various modes. The handle 12 is preferably fitted into a cylindrical handle receiving member 13 which is attached to the implement body.

The implement body generally comprises a flat central plate member 14 whose overall configuration is of a stylized keystone.

The handle receiving member 13 may be attached to the central plate 14 in any number of ways. However, it has been found that ordinary welding will normally accomplish the task better than other attachment methods.

Depending from the lower most edge of the central plate 14 is a digging blade 15 which, at its upper most portion, is attached to the central plate 14 at a first bend line 16 and then tapers from a width that is equivalent to the width of the central plate down to a point 17. Between the point 17 and the first bend line 16, is a second bend line 18. The digging blade 15 is preferably bent at each of the aforementioned bend lines in such a fashion as to project the point 17 in the direction of the handle so that when the implement is utilized, the blade is projecting toward the user thereby facilitating digging of the soil in a pulling motion by the user. Such a use, in effect, makes the implement 11 a hand held plow and of course the digging blade 15 should be of such construction as to enable the user to plow or dig in reasonably firm ground.

As seen in the preferred embodiment of FIG. 1, at the opposite edge of the central plate 14 from the blade 15, there is projecting upwardly and rearwardly an upper middle rake blade 19 which is of tapered configuration terminating in a point 21. At the junction point of the blade 19 with the central plate 14, is a bend line 22 along which the blade 19 is bent rearwardly. As can be readily observed, blade 19 forms a middle rake tine with two other blades which will be subsequently described herein. With the other two blades, the present invention then becomes a three point rake implement.

On the two remaining edges of the central plate 14, there are attached a pair of elongated rake blades 23 and 24. These two rake blades are attached to the central plate 14 at the two remaining side edges thereof and the blades project rearwardly of the central plate away from the handle 12 in such a manner that they diverge from one another so that the included angle there between is less that 90°. Each of the rake blades 23 and 24, as mentioned, are of elongated shape and generally of rectangular configuration consistent with the needs to which they are put. Therefore, in conjunction with the upper middle rake blade 19, the two rake blades 23 and 24 form a three point rake and when all three blades are in contact with the ground, the user of the implement 11 may perform a great many raking functions.

In the embodiment shown in FIG. 7, the middle rake blade has been eliminated should a user desire the garden implement without the extra blade to form a three point rake.

Therefore, it is evident that the multi-purpose implement described herein can be used much as a hoe which is utilized as a de-weeding tool to remove weeds from around plants and to scrape dirt in and around plants. As previously described, the third blade 19 makes the implement a three pointed rake to be used to break up clods of dirt and to smooth out the dirt once it has been broken up and cover seeds after they have been sown. One of the main functions of the implement 11 is the use of it as a plow by which a small garden could be plowed by utilizing blade 15 to lay off rows in which seeds can be planted.

To plow with the implement 11, the user would hold the implement in a normal manner, with both hands, and pull and push alternately with the digging blade 15 in contact with the ground, keeping an even pressure thereon.

Various modifications may be made in the invention without departing from the spirit and scope thereof, and it is desired therefore that only such limitations shall be placed thereon as are imposed by the prior art and as are set forth in the appended claims.

What is claimed is:

1. A hand held garden implement having an elongated handle and further comprising a flat central plate portion to which the handle is affixed, said flat central plate portion having a forward side and rearward side and being generally of rectangular shape having four edges therewith, the forward and rearward sides further defining corresponding forward and rearward directions pointing away from the respective sides of the flat central plate, a handle receiving member centrally attached to the forward side of the flat central plate, said handle receiving member being of cylindrical configuration, said handle being received in said handle receiving member and projecting in the forward direction away from the central plate, a tapered digging blade integral with the flat central plate and depending from one of said edges thereof, said one edge at the juncture of the digging blade and the central plate comprising a first bend line, said digging blade terminating in a point, and wherein said point lies in a plane that passes through and lies along the longitudinal axis of the handle, the tapered digging blade being bent along the first bend line at the junction of said blade and the flat central plate, the tapered digging blade further being bent along the bend line in the forward direction toward which the handle also projects from the central plate, first and second rake blades projecting in the rearward direction with respect to the central plate, said rake blades projecting from two additional ones of said edges of the flat central plate, which additional edges are opposite each other, said rake blades projecting from the flat central plate at a diverging angle wherein the included angle between the diverging blades is less than 90°, said rake blades being of flat elongated substantially rectangular configuration, said rake blades each being most elongated in a direction pointing away from the adjacent said additional edge of said central plate.

2. A hand held garden implement as claimed in claim 1, wherein said tapered digging blade comprises a second bend line lying through the mid-portion thereof and parallel to the first bend line, the tapered digging blade being further bent forwardly along the second bend line.

3. A hand held garden implement as claimed in claim 2, wherein the implement comprises a third rake blade projecting from that one of said edges of the flat central plate that is opposite the edge to which the tapered blade is attached, said that edge at the juncture of the third rake blade and the central plate comprising a third bend line, the third rake blade being affixed to said that edge of said flat central plate at the third bend line along which the third rake blade is bent rearwardly in the rearward direction toward which the elongated rake blades also point.

* * * * *